Figure 1:
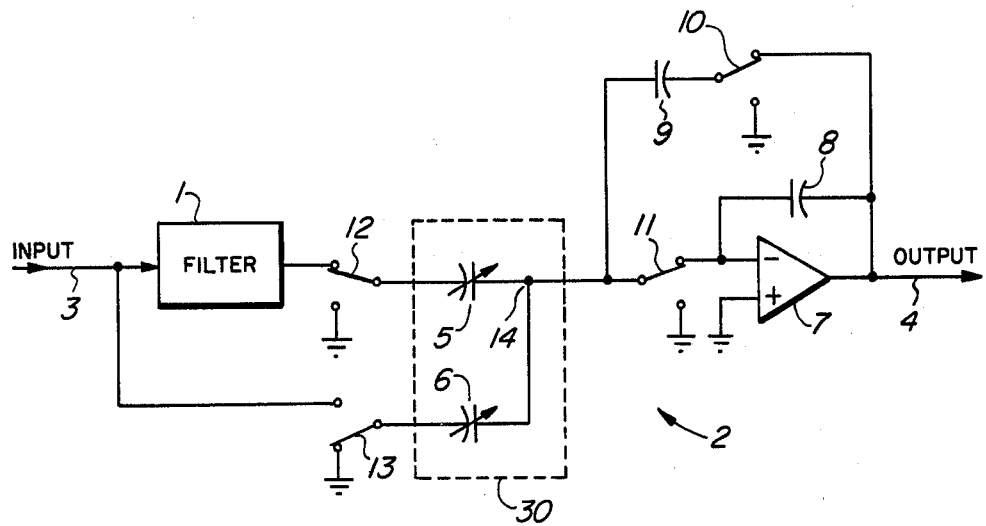

United States Patent [19]

Bennett

[11] 4,453,143
[45] Jun. 5, 1984

[54] SWITCHED-CAPACITOR VARIABLE EQUALIZER

[75] Inventor: Jeffrey H. Bennett, Ottawa, Canada

[73] Assignee: Northern Telecom Limited, Montreal, Canada

[21] Appl. No.: 411,413

[22] Filed: Aug. 25, 1982

[51] Int. Cl.³ .............................................. H03H 11/06
[52] U.S. Cl. .................................. 333/28 R; 333/173; 330/107
[58] Field of Search ............ 333/281 R, 173; 330/51, 330/107, 109, 304; 381/103

[56] References Cited

U.S. PATENT DOCUMENTS 4,313,096 1/1982 Fleischer .............................. 333/173
4,315,227 2/1982 Fleischer et al. ..................... 333/173

OTHER PUBLICATIONS

Allstot et al., "Electrically-Programmable Switched Capacitor Filter", IEEE Journal of Solid State, vol. SC-14, No. 6, Dec. 1979, pp. 1034–1041.

Primary Examiner—Paul L. Gensler
Assistant Examiner—Benny Lee
Attorney, Agent, or Firm—R. John Haley

[57] ABSTRACT

An equalizer for loaded telephone lines comprises a switched-capacitor summing amplifier which sums the input to and output from the filter in proportions which vary with the capacitances of two variable capacitors. The variable capacitors are constituted by a plurality of fixed capacitors which are switched to form part of one varibale capacitor or the other, so that the sum of the capacitances of the variable capacitors is constant.

7 Claims, 4 Drawing Figures

SWITCHED-CAPACITOR VARIABLE EQUALIZER

This invention relates to a switched-capacitor variable equalizer, especially for equalizing signals conducted via loaded telephone lines.

It is well-known to provide an equalizer to compensate for the variation with frequency of the attenuation of a telephone line. For a loaded telephone line, an equalizer providing most of the equalization for voice-frequency signals is desired to have a gain with a relatively sharp peak at a frequency of about 3.3 kHz. If the equalizer is to be used for signals conducted via different lines which have different attenuations, then the magnitude of the equalizer's gain peak must be variable to compensate properly for the different attenuations.

An equalizer can be provided using resonant circuits. However, these tend to be large and are not susceptible to integration, as is desirable for example where the equalizer is to form part of a voice-frequency signal repeater. Accordingly, an object of this invention is to provide a novel variable equalizer, which is particularly suitable for integration.

According to this invention there is provided a variable equalizer comprising a filter, a summing amplifier, means for applying a signal to be equalized to an input of the filter, and means for deriving an equalized signal from an output of the summing amplifier, the summing amplifier comprising a switched-capacitor amplifier stage having a first variable capacitor coupled between an output of the filter and an input of the amplifier stage and having a second variable capacitor coupled between the input of the filter and an input of the amplifier stage, each of the first and second variable capacitors comprising a switched-capacitor.

The first and second variable capacitors are preferably variable in such a manner that the sum of their capacitances is fixed, these capacitors conveniently comprising a plurality of fixed capacitors and switching means for switching each of said fixed capacitors to constitute either at least a part of the first variable capacitor or at least a part of the second variable capacitor. Thus the variable capacitors can be conveniently implemented using switched-capacitor techniques.

Conveniently, the filter is an inverting filter and one of the first and second variable capacitors, for example the first, comprises a through-switched capacitor and the other, for example the second, comprises a diagonally-switched capacitor. Conceivably, however, the filter may be non-inverting and the first and second variable capacitors may be similarly switched, i.e. both through-switched or both diagonally-switched.

Preferably the amplifier stage comprises an amplifier having an inverting input, to which the first and second variable capacitors are coupled via a common switch, and an output constituting the output of the summing amplifier; an unswitched capacitor coupled between the output and the inverting input of the amplifier; and a through-switched capacitor coupled between the output and the inverting input of the amplifier via said common switch.

The filter preferably comprises a switched-capacitor filter comprising first and second amplifiers each having an inverting input and an output, the output of the filter being derived from the output of the second amplifier, an unswitched capacitor coupled between the output and the inverting input of the first amplifier, an unswitched capacitor coupled between the output and the inverting input of the second amplifier, an unswitched capacitor and a through-switched capacitor each coupled between the output of the second amplifier and the inverting input of the first amplifier, a through-switched capacitor coupled between the filter input and the inverting input of the first amplifier, an unswitched capacitor and a through-switched capacitor each coupled between the filter input and the inverting input of the second amplifier, and a diagonally-switched capacitor coupled between the output of the first amplifier and the inverting input of the second amplifier.

Thus this invention facilitates the provision of a variable equalizer, especially for equalizing signals conducted via loaded telephone lines, which can conveniently be incorporated, for example together with other components of a voice-frequency signal repeater, in an integrated circuit.

Figure 2:
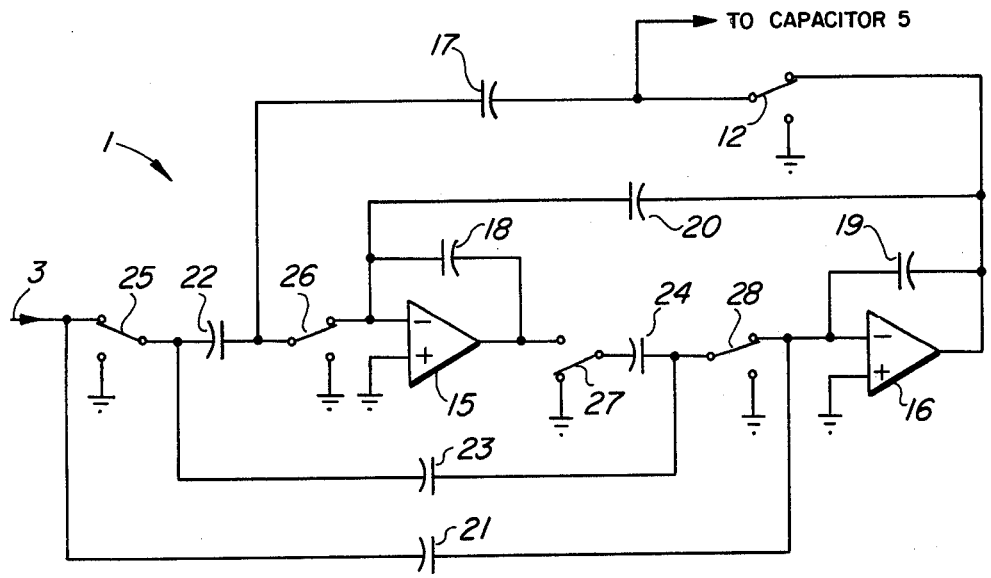
Figure 3:
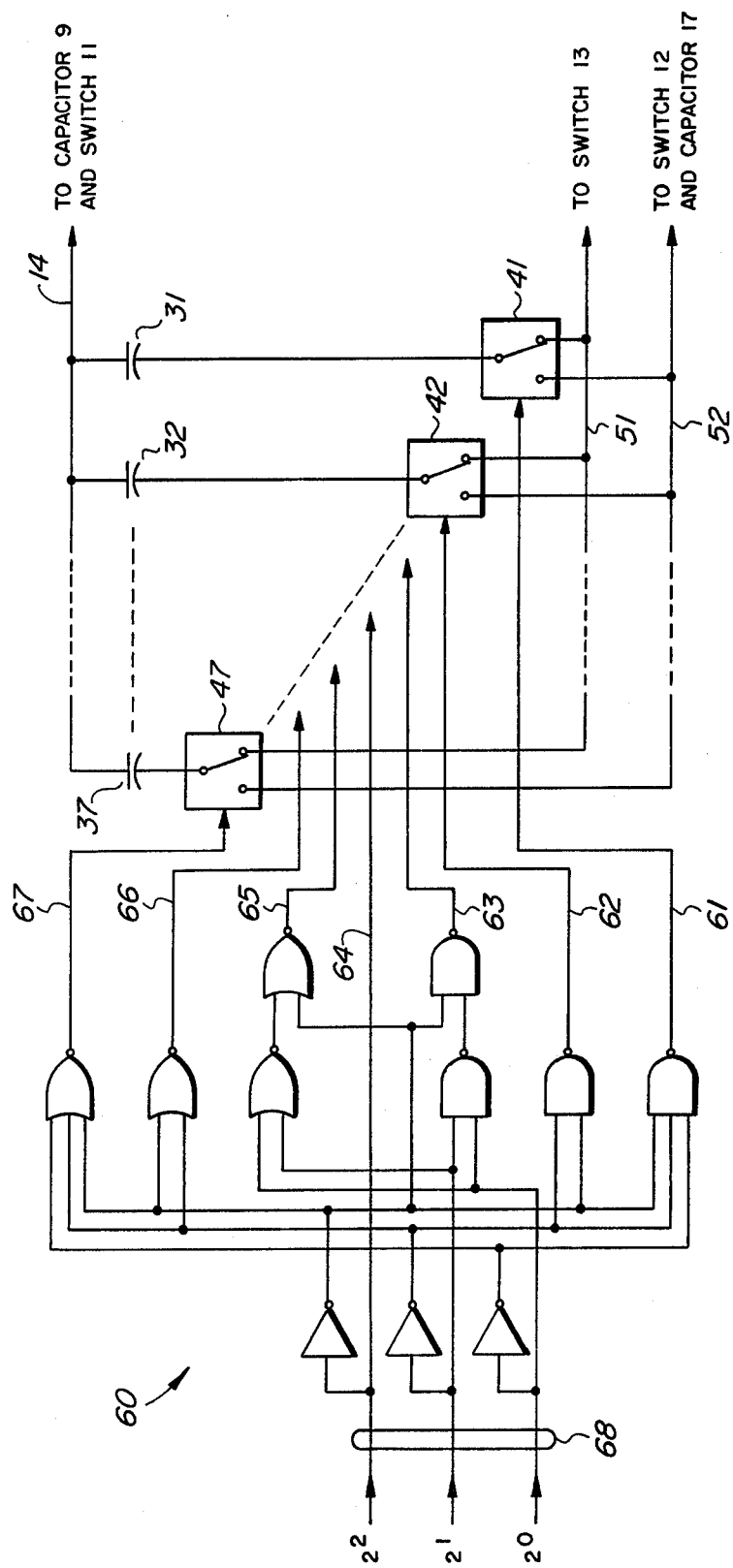
Figure 4:
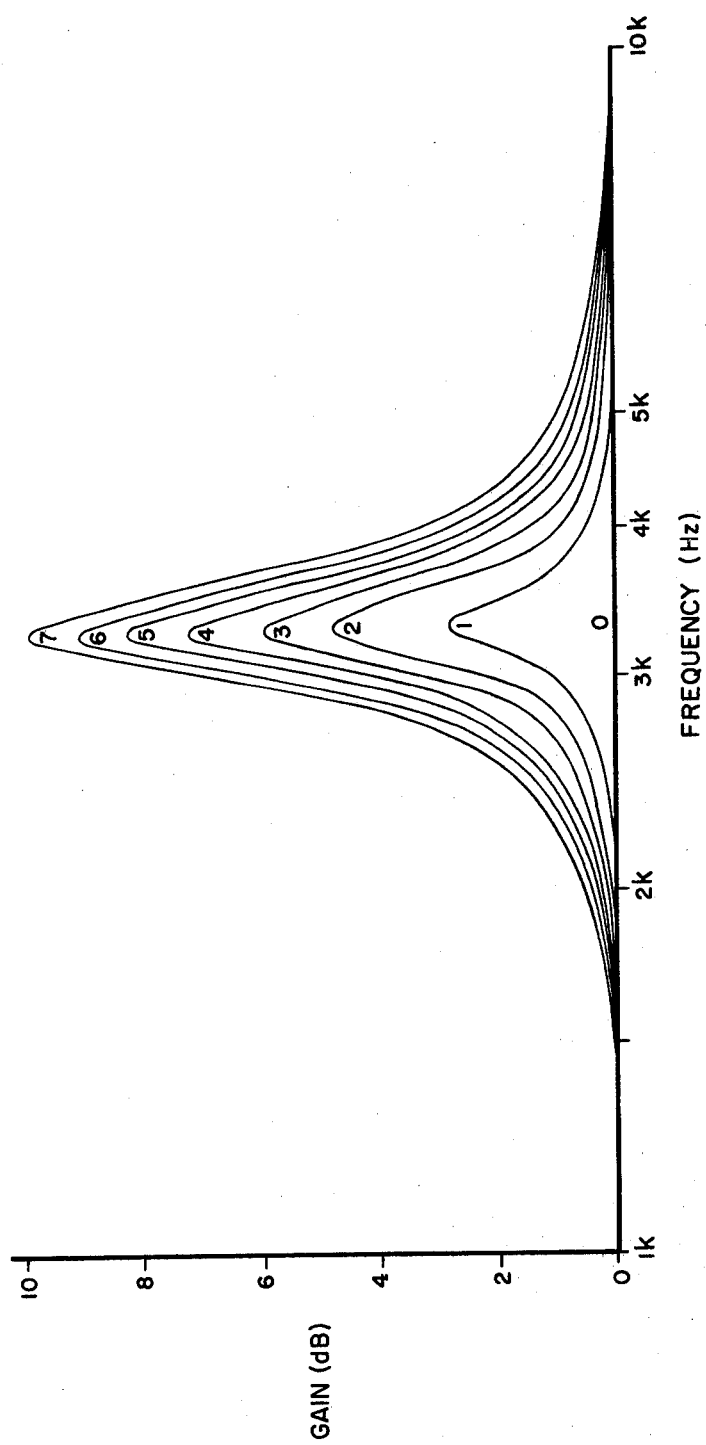

The invention will be further understood from the following description with reference to the accompanying drawings, in which:

FIG. 1 schematically illustrates a variable equalizer in accordance with the invention;

FIG. 2 schematically illustrates the form of a filter which is provided in the equalizer;

FIG. 3 schematically illustrates the form of variable capacitors which are provided in the equalizer; and FIG. 4 is a graph illustrating gain-frequency responses of the equalizer.

The invention uses switched-capacitor techniques. As used herein, the term "unswitched capacitor" means a capacitor that is permanently connected in the circuit, the term "through-switched capacitor" means a switched-capacitor whose two terminals are simultaneously grounded during one of two switching states, and the term "diagonally-switched capacitor" means of a switched-capacitor whose terminals are alternately grounded during successive ones of two switching states. In FIGS. 1 and 2 the various switches of the switched-capacitors are shown in one of their two switching states; all of these switches are operated in synchronism by means not shown. The switches in FIG. 3 are separately controlled as described below. All of the switches can be controlled and implemented by CMOS devices as is well-known in the art.

Referring to FIG. 1, the equalizer comprises a filter 1 and a summing amplifier 2. A signal to be equalized is applied to the input of the filter 1 via a line 3, and an equalized signal is derived from an output of the summing amplifier 2 via a line 4. The input signal to the filter 1 and the output signal from the filter 1 are combined by the summing amplifier 2 in variable quantities, determined by the capacitances of variable capacitors 5 and 6 of the summing amplifier, to provide various equalizer responses which are shown in FIG. 4.

To this end the summing amplifier also comprises a differential amplifier 7 having an output coupled to the line 4, a grounded non-inverting input, and an inverting input; an unswitched integrating capacitor 8 connected between the output and the inverting input of the amplifier 7; and a through-switched negative feedback capacitor 9 which is coupled between the output and the inverting input of the amplifier 7 via switches 10 and 11 respectively. The variable capacitor 5 is a through-switched capacitor coupled between the output of the filter 1 and the inverting input of the amplifier 7 via a switch 12 and the switch 11 respectively, and the variable capacitor 6 is a diagonally-switched capacitor coupled between the line 3 and the inverting input of the amplifier 7 via a switch 13 and the switch 11 respectively. The switch 11 is thus common to the switched-capacitors 5, 6, and 9, and the variable capacitors 5 and 6 have a common terminal 14.

The filter 1 is a switched-capacitor active filter whose frequency response has the form of a curve 7 in FIG. 4. The filter is illustrated in FIG. 2, and its form can be derived from the generalized switched-capacitor active filter described in Fleischer et al. U.S. Pat. No. 4,315,227 issued Feb. 9, 1982. In this case the filter is an inverting filter. It is for this reason that one of the capacitors 5 and 6, namely the capacitor 6, is diagonally-switched whereas the other is through-switched. If the filter were non-inverting, the capacitors 5 and 6 would be both through-switched or both diagonally-switched.

The filter 1 includes two differential amplifiers 15 and 16, whose non-inverting inputs are grounded, the output of the filter being derived from the output of the amplifier 16. This output is coupled to the inverting input of the amplifier 15 via a through-switched capacitor 17. In order to reduce the number of switches required, the switch 12 is used not only for through-switching the capacitor 5 as described above but also for through-switching the capacitor 17. Accordingly the switch 12 is common to the filter 1 and the summing amplifier 2, the capacitor 5 being connected to the junction between this switch and the capacitor 17. A similar arrangement can be provided, if desired, at the output of the summing amplifier 2, with the switch 10 serving commonly for the summing amplifier and a following switched-capacitor stage, not shown.

The filter 1 also comprises unswitched capacitors 18 to 21, through-switched capacitors 22 and 23, a diagonally-switched capacitor 24, and switches 25 to 28. The capacitors 18 and 19 are connected between the output and the inverting input of the amplifiers 15 and 16 respectively. The capacitor 20 is connected between the output of the amplifier 16 and the inverting input of the amplifier 15. The capacitor 21 is connected between the input line 3 and the inverting input of the amplifier 16. The through-switched capacitors 22 and 23 are coupled between the input line 3 and the inverting inputs of the amplifiers 15 and 16 respectively, and the diagonally-switched capacitor 24 is coupled between the output of the amplifier 15 and the inverting input of the amplifier 16. The switch 25 serves commonly for switching the capacitors 22 and 23, the switch 26 serves commonly for switching the capacitors 17 and 22, the switch 27 serves for switching the capacitor 24, and the switch 28 serves commonly for switching the capacitors 23 and 24.

The variable capacitors 5 and 6 and their common terminal 14 are schematically illustrated in FIG. 1 within a dashed-line box 30. FIG. 3 schematically illustrates a preferred form of components within the box 30.

As illustrated in FIG. 3, the variable capacitors 5 and 6 are constituted by a plurality of fixed capacitors and switches for switching each capacitor to constitute either part, or all, of the variable capacitor 5 or part, or all, of the variable capacitor 6. In this embodiment there are 7 fixed capacitors 31 to 37, of which only the capacitors 31, 32, and 37 are shown in FIG. 3, the others being similarly arranged. Each capacitor 31 to 37 is switchable via a respective one of switches 41 to 47, of which only the switches 41, 42, and 47 are shown in FIG. 3, so that it is connected between a line 14, corresponding to the common terminal 14 in FIG. 1, and either a line 51 leading to the switch 13 or a line 52 leading to the switch 12 and the capacitor 17.

The two variable capacitors 5 and 6 are thus constituted in this embodiment of the invention by the 7 fixed capacitors 31 to 37 and the switches 41 to 47, the arrangement being such that the sum of the capacitances of the variable capacitors 5 and 6 is always constant and equal to the sum of the capacitances of the capacitors 31 to 37.

The switches 41 to 47 are controlled, via a decoding logic circuit 60 and respective control lines 61 to 67, by a 3-bit digital signal on 3 control lines 68, the weighting of which is illustrated in FIG. 3. The digital signal, which can for example be set up on the lines 68 by means of manually operated switches set according to the desired equalizer characteristic, can have values equivalent to the decimal values 0 to 7. The switches 41 to 47 are illustrated for the decimal input 0, in which the capacitance of the capacitor 5 is zero so that the summing amplifier 2 receives only the input signal from the line 3 and the equalizer has a flat response as shown by the line 0 in FIG. 4. For a decimal input H ($0<H<7$), logic "1" levels are produced on the lines 61 to ($60+H$) to cause the switches 41 to ($40+H$) to change state so that the variable capacitor 5 is constituted by the capacitors 31 to ($30+H$) in parallel, whereby the summing amplifier 2 sums different proportions of the input signal to and the output signal from the filter 1 so that the equalizer has a response as shown by the respective curve H in FIG. 4. For the decimal input 7, all of the switches 41 to 47 have the opposite state to that shown in FIG. 3 so that the capacitance of the capacitor 6 is zero and the equalizer has the same frequency response as the filter 1, as shown by the curve 7 in FIG. 4.

As will be appreciated by those skilled in the art, the equalizer described above can be implemented, together with other switched-capacitor circuitry if desired, in a single integrated circuit, for example using a CMOS double polysilicon process. In such an arrangement, in which the bottom plate of each capacitor is represented by a curved line in the drawings, used as an equalizer for voice-frequency signals carried via loaded telephone lines, the capacitors can have the following magnitudes to provide equalizer response curves which are 0.5 dB apart at a frequency of 2.8 kHz:

| Capacitor | Magnitude (pF) | Capacitor | Magnitude (pF) |
| --- | --- | --- | --- |
| 8 | 2.24 | 17 | 1.867 |
| 9 | 3.5 | 18 | 8.0 |
| 31 | 0.77 | 19 | 8.0 |
| 32 | 0.56 | 20 | 1.611 |
| 33 | 0.46 | 21 | 7.524 |
| 34 | 0.44 | 22 | 1.848 |
| 35 | 0.43 | 23 | 0.607 |
| 36 | 0.42 | 24 | 0.954 |
| 37 | 0.42 | | |

The invention is not limited to the particular embodiment described, and numerous modifications, variations, and adaptations may be made thereto without departing from the scope of the invention s defined in the claims. In this respect in particular it is observed that the gain of the overall equalizer may be made variable by making the capacitor 9 a variable capacitor, for example constituted by a plurality of switched, fixed capacitors arranged in parallel with one another in a manner similar to that of the capacitors 5 and 6. Furthermore, any desired number and separation of equalizer responses can be provided by appropriate selection and control of the capacitors constituting the variable capacitors 5 and 6.

What is claimed is:

1. A variable equalizer comprising a filter, a summing amplifier, means for applying a signal to be equalized to an input of the filter, and means for deriving an equalized signal from an output of the summing amplifier, the summing amplifier comprising a switched-capacitor amplifier stage having a first variable capacitor coupled between an output of the filter and an input of the amplifier stage and having a second variable capacitor coupled between the input of the filter and an input of the amplifier stage, each of the first and second variable capacitors comprising a switched-capacitor.

2. An equalizer as claimed in claim 1 wherein the first and second variable capacitors are variable in such a manner that the sum of their capacitances is fixed.

3. An equalizer as claimed in claim 2 wherein the first and second variable capacitors comprise a plurality of fixed capacitors and switching means for switching each of said fixed capacitors to constitute either at least a part of the first variable capacitor or at least a part of the second variable capacitor.

4. An equalizer as claimed in claim 1, 2, or 3 wherein the filter is an inverting filter and one of the first and second variable capacitors comprises a through-switched capacitor and the other comprises a diagonally-switched capacitor.

5. An equalizer as claimed in claim 1, 2, or 3 wherein the amplifier stage comprises an amplifier having an inverting input, to which the first and second variable capacitors are coupled via a common switch, and an output constituting the output of the summing amplifier; an unswitched capacitor coupled between the output and the inverting input of the amplifier; and a through-switched capacitor coupled between the output and the inverting input of the amplifier via said common switch.

6. An equalizer as claimed in claim 1, 2, or 3 wherein the filter comprises a switched-capacitor filter.

7. An equalizer as claimed in claim 1, 2, or 3 wherein the filter comprises a switched-capacitor filter comprising first and second amplifiers each having an inverting input and an output, the output of the filter being derived from the output of the second amplifier, an unswitched capacitor coupled between the output and the inverting input of the first amplifier, an unswitched capacitor coupled between the output and the inverting input of the second amplifier, an unswitched capacitor and a through-switched capacitor each coupled between the output of the second amplifier and the inverting input of the first amplifier, a through-switched capacitor coupled between the filter input and the inverting input of the first amplifier, an unswitched capacitor and a through-switched capacitor each coupled between the filter input and the inverting input of the second amplifier, and a diagonally-switched capacitor coupled between the output of the first amplifier and the inverting input of the second amplifier.

* * * * *